(12) United States Patent
Hayashi

(10) Patent No.: US 6,887,150 B2
(45) Date of Patent: May 3, 2005

(54) RACING GAME MACHINE WITH VIRTUAL TELESCOPE

(75) Inventor: Ryoji Hayashi, Tokyo (JP)

(73) Assignee: Konami Corporation, Tokyo (JP)

( * ) Notice: Subject to any disclaimer, the term of this patent is extended or adjusted under 35 U.S.C. 154(b) by 80 days.

(21) Appl. No.: 10/036,440

(22) Filed: Jan. 7, 2002

(65) Prior Publication Data
US 2002/0094853 A1 Jul. 18, 2002

(30) Foreign Application Priority Data
Jan. 12, 2001 (JP) .................................... P.2001-004637

(51) Int. Cl.$^7$ ................................................. A63F 13/00
(52) U.S. Cl. .......................................... 463/6; 463/33
(58) Field of Search .......................... 463/1–6, 7, 16, 463/25; 446/444; 273/236, 237

(56) References Cited

U.S. PATENT DOCUMENTS

| 5,320,351 | A | * | 6/1994 | Suzuki | 463/6 |
| 5,411,258 | A | * | 5/1995 | Wilson et al. | 463/6 |
| 5,601,490 | A | * | 2/1997 | Nakagawa et al. | 463/63 |
| 5,830,068 | A | * | 11/1998 | Brenner et al. | 463/42 |
| 6,059,657 | A | * | 5/2000 | Oh et al. | 463/6 |
| 6,394,898 | B1 | * | 5/2002 | Nagao et al. | 463/6 |

FOREIGN PATENT DOCUMENTS

| JP | 7-108088 | 4/1995 |
| JP | 2000-157715 | 6/2000 |

* cited by examiner

Primary Examiner—John M. Hotaling, II
(74) Attorney, Agent, or Firm—Sughrue Mion, PLLC

(57) ABSTRACT

In a racing game machine, a race course is provided on a table unit. A plurality of miniatures travel on the race course to perform a race. A plurality of satellite terminals, each operated by a player who participates the race as an audience, are arranged around the table unit. Each satellite terminal is provided with a virtual telescope including a built-in display showing to the player a computer graphic image which exhibits a state of the race performed on the race course as if the player observe the race therethrough.

6 Claims, 5 Drawing Sheets

RACING GAME MACHINE WITH VIRTUAL TELESCOPE

BACKGROUND OF THE INVENTION

The present invention relates to a racing game machine in which players compete with each other for a victory by predicting the order of arrival of miniature running members which travel over a race course; for example, a horseracing game machine to be installed in an amusement arcade.

A horseracing game machine has hitherto been widely known as one type of racing game machine. A race course of substantially oval shape is provided on a table face of the horseracing game machine. A plurality of miniature running members imitating racehorses travel over the race course under control of a computer. A plurality of satellite terminals to be used by players are disposed around the race course. Each of the satellite terminals is provided with a monitor for displaying various types of information items, a control panel for use in inputting information, a gaming token insertion slot, and a gaming token payout port. A player inserts gaming tokens by way of the insertion slot, predicts the order of arrival of the miniature running members (i.e., racehorses), and places bets on predicted winning horses by the straight betting way or the combination betting way.

In some racing game machines, a plurality of satellite terminals are provided not only around a race course but also in tiers relative to the race course so that a plurality of players can enjoy a game. For instance, Japanese Patent Publications Nos. 7-108088 and 2000-157715 describe racing game machines, wherein satellite terminals are arranged in rows by utilization of tiered floors so that players who use satellite terminals remote from a race course can view the status of a race effected on the race course.

However, in relation to a racing game machine, in order to enable an increase in the number of players who enjoy games simultaneously, there is no alternative but to increase the number of rows where satellite terminals are to be disposed, depending on restrictions imposed on a floor. Satellite terminals arranged in the highest tier are distant from the race course. Therefore, even when satellite terminals are arranged in tiered floors, players sitting at satellite terminals arranged in the highest tier cannot readily ascertain the state of a race effected on a race course, and as a result the players may lose interest in playing racing games.

In an actual stadium where spectators watch various sports, including an actual race track, spectators are often remote from racehorses (or players). In such a case, not a few spectators amuse themselves by use of, e.g., binoculars, while feeling close at hand to the competition. Even in the case of a racing game machine, if there are available means for causing spectators to feel no remoteness, such as binoculars, players can accurately ascertain the state of a race effected on a race course from satellite terminals tiered rearward. Hence, it is thought that the players will feel the realism of a game such as that felt when watching an actual sport.

SUMMARY OF THE INVENTION

The present invention is aimed at providing a race gaming machine which can enhance players' interest in a racing game, and enables players to feel the realism of a game as if observing an actual sport.

In order to achieve the above object, according to the present invention, there is provided a racing game machine, comprising:

a table unit, on which a race course is provided;

a plurality of miniatures, traveling on the race course to perform a race; and a plurality of satellite terminals, arranged around the table unit, each operated by a player who participates the race as an audience, each satellite terminal provided with a virtual telescope including a built-in display showing to the player a computer graphic image which exhibits a state of the race performed on the race course as if the player observes the race therethrough.

In this configuration, when a player who operates the satellite terminal peeps through the virtual telescope, the display accommodated in the virtual telescope displays a computer graphic image corresponding to the state of a race performed on the race course. The player can accurately ascertain the state of the race by way of the computer graphic image. Further, the player can experience the realism of a game as if observing an actual race through use of a telescope. Consequently, regardless of layout of the satellite terminals, a player's interest in the racing game can be enhanced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A racing game machine according to the present invention will be described hereinbelow by reference to the accompanying drawings. Here, the present invention will be described by reference to a case where the present invention is applied to a horseracing game machine.

Figure 1:
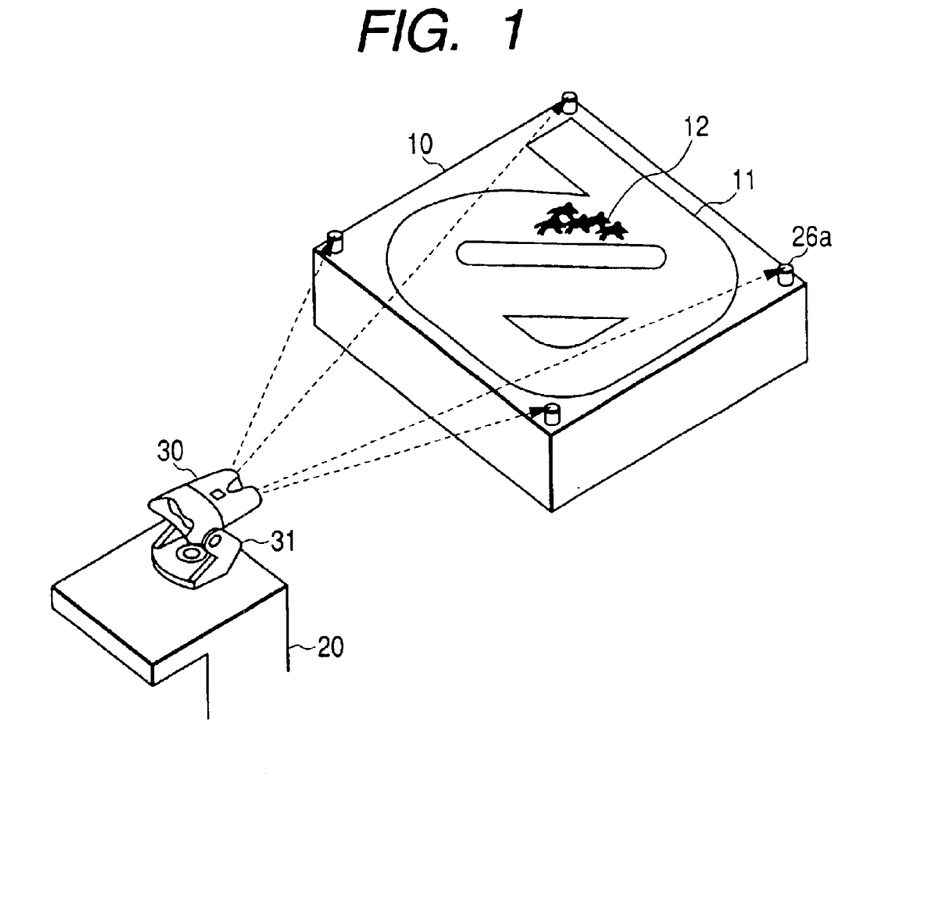
FIG. 1 is a perspective view showing an example of rough configuration of a racing game machine according to the present invention.

As shown in FIG. 1, a horseracing game machine to be described in connection with the present embodiment roughly comprises a main unit 10 and a satellite terminal 20.

In the main unit 10, a race course 11 imitating a race track is provided on a table. A plurality of miniature running members 12 imitating a plurality of racehorses travel over the race course 11 under control of a computer. Details of a mechanism for causing the miniature running member 12 are already known, and hence their explanations are omitted.

Figure 2:
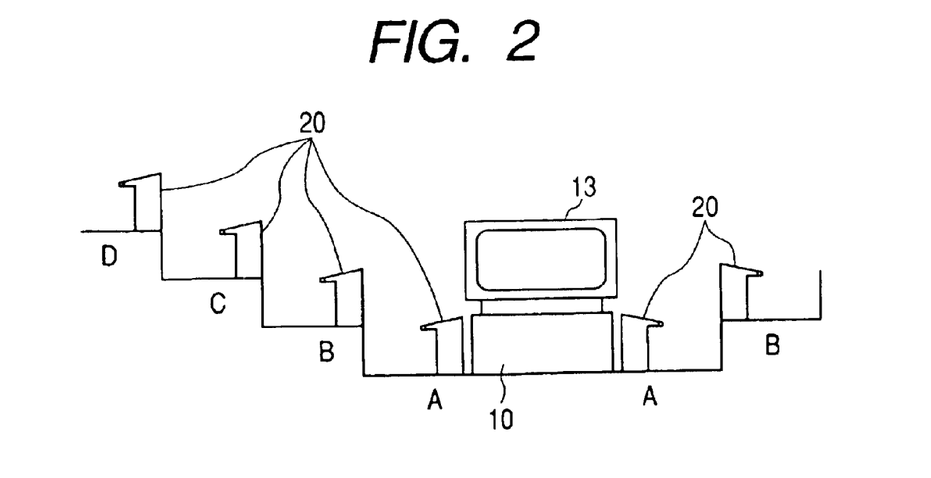
FIG. 2 is a descriptive view showing an example of layout of satellite terminals employed in the racing game machine.

As shown in FIG. 2, the main unit 10 may be provided with a large display 13 for displaying various types of information items, including a table of horses entered in a race or computer graphic images representing the state of the race.

Figure 3:
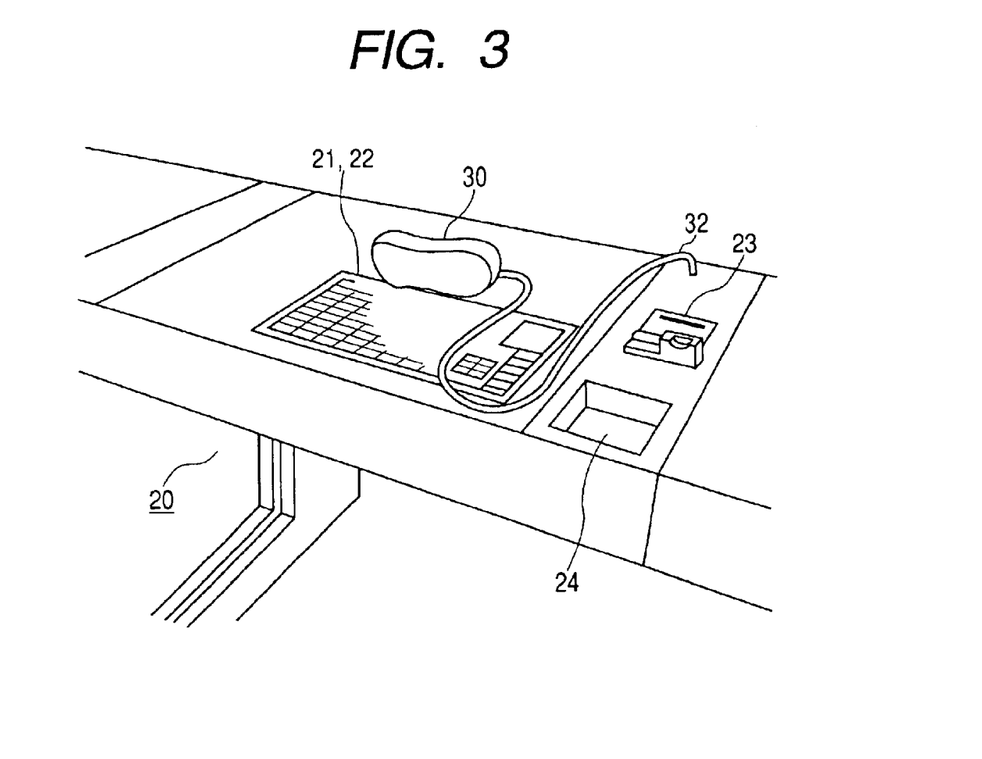
FIG. 3 is a perspective view showing an example of rough configuration of a satellite terminal employed in the racing game machine.

The satellite terminal 20 is to be used by a player who predicts the order of arrival of the miniature running members 12 running over the race course 11. To this end, as shown in FIG. 3, the satellite terminal 20 is provided with a monitor 21 which displays various types of information items, as does the large display 13; a touch panel 22 which is laminated on the monitor 21 and is to be used for inputting information; an insertion slot 23 which enables a player to insert a predetermined gaming token; and a payout port 24 for paying out gaming tokens to the player, as required. A player inserts a gaming token into the insertion slot 23, predicts the order of arrival of miniature running members (racehorses) 12, and places bets on predicted winning horses by the straight betting way or the combination betting way.

As shown in FIG. 2, a plurality of satellite terminals 20 are provided around the main unit 10; that is, the race course 11 (see A in FIG. 2). Further, by utilization of. e.g., tiered floors, the satellite terminals 20 are arranged into a plurality of tiers relative to the race course 11 (see B, C and D in FIG. 2). As a result, a larger number of players can simultaneously enjoy a race of the miniature running members 12 performed on a single race course 11.

Figure 4:
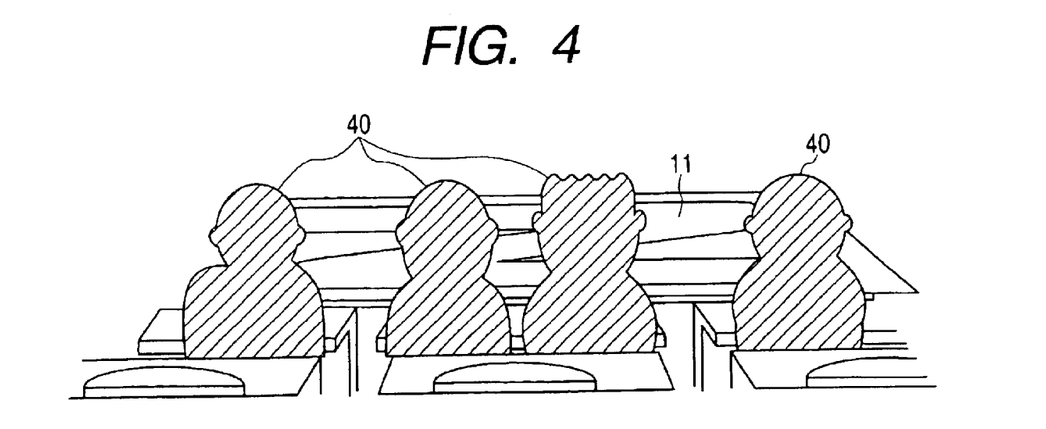
FIG. 4 is a descriptive view showing an example state in which player view from satellite terminals.

When the plurality of satellite terminals 20 are tiered, as shown in FIG. 4, players sitting in front of the satellite terminals 20 disposed in the second and higher tiers are remote from the race course 11, or may have their views partially blocked by other players 40 present at positions closer to the race course 11, whereby easy ascertainment of the state of a race performed on the race course 11 is hindered.

As shown in FIG. 1 or 3, in the horseracing game according to the present embodiment, virtual telescopes 30 to be used by players who operate the satellite terminals 20 are provided individually on the satellite terminals 20 disposed in the second and higher tiers. Conceivable virtual telescopes 30 include binocular-type telescopes, cylindrical telescopes, and glass-type telescopes. As shown in FIG. 1, the virtual telescope 30 may be movably supported by a support 31 mounted on the table of the satellite terminal 20. As shown in FIG. 3, the virtual telescope 30 may be connected simply to the satellite terminal 20 via a cable 32.

Figure 5:
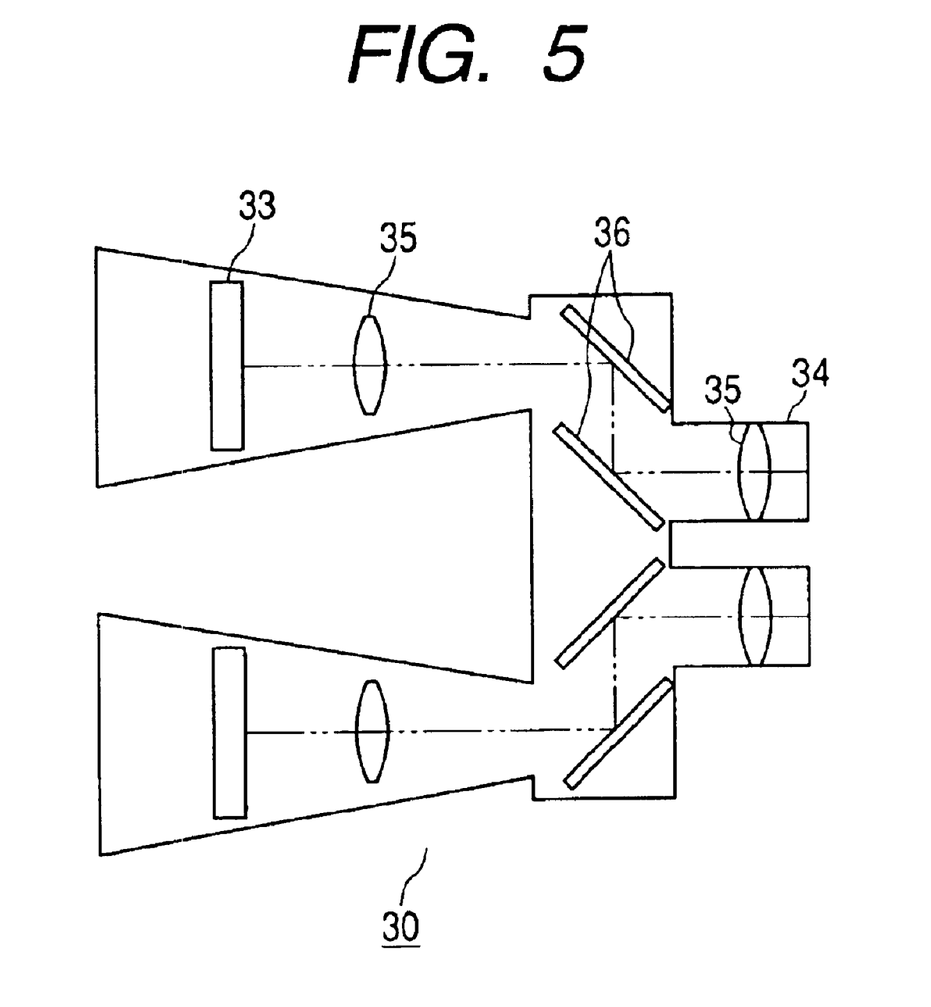
FIG. 5 is a cross-sectional view showing an example of rough configuration of a virtual telescope employed in the racing game machine.

The virtual telescope will now be described in more detail by taking a binocular-type telescope as an example. FIG. 5 is a cross-sectional view showing an example of rough configuration of a virtual telescope employed in a horseracing game machine to which the present invention is applied. As illustrated, the virtual telescope 30 accommodates a display 33 constituted of a color liquid-crystal panel. When a player peeps through an eyepiece section 34 of the virtual telescope 30, the player views an image displayed on the display 33, via a lens 35 and mirrors 36, which are provided as required.

The virtual telescope 30 is provided with a sensor (not shown) for detecting a position on the race course 11 to which the virtual telescope 30 is oriented. As will be described in detail, a sensor constituted of, e.g., a charge-coupled-device (CCD) camera and an analog volume controller (i.e., a variable resistor), is mentioned as the sensor.

The function and construction of the horseracing game machine set forth will now be described. Here, an explanation is given of only the function and construction of the virtual telescope 30. In other respects, the horseracing game machine is identical in function with the related-art horseracing game machine, and hence their explanations are omitted.

Figure 6:
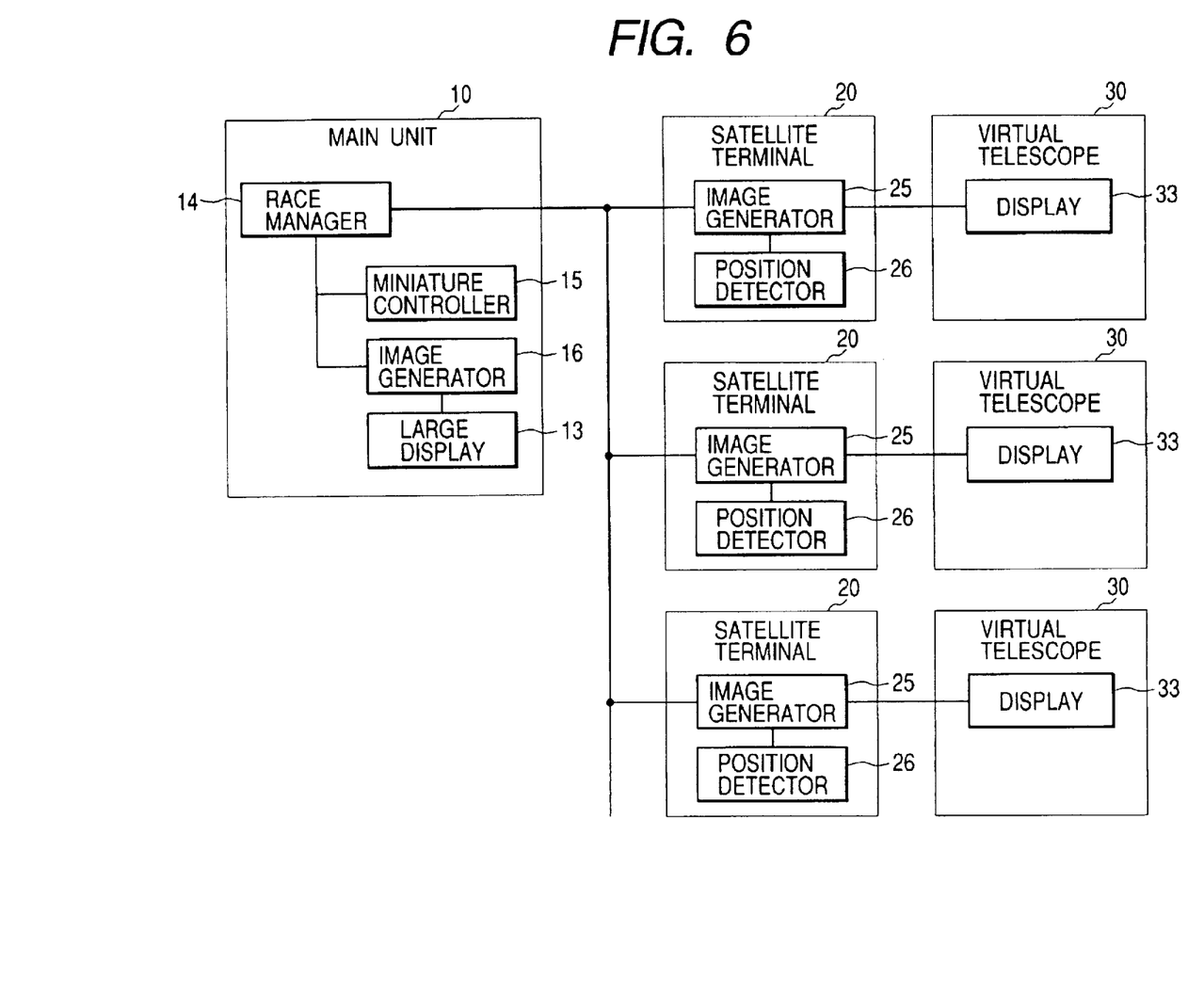
FIG. 6 is a block diagram showing an example of function and configuration of the racing game machine.

FIG. 6 is a block diagram showing an example function and construction of a horseracing game machine to which the present invention is to be applied. As illustrated, the main unit 10 of the horseracing game machine has the function of serving as a race manager 14, a miniature controller 15, and an image generator 16. The race manager 14, the miniature controller 15 and the image generator 16 may be embodied by a CPU (central processing unit) for implementing, e.g., a predetermined program, or by use of a known computer-graphic generation board.

The race manager 14 is for managing a race performed by the miniature running members 12 (e.g., the order of arrival). In accordance with an instruction output from the race manager 14, the miniature controller 15 controls running action of the miniature running members 12 performed on the race course 11. In accordance with an instruction output from the race manager 14, the image generator 16 produces an image pertaining to a race performed by the miniature running members 12. The thus-produced image is displayed on the large display 13. The large display 13 shows information; e.g., introduction of racehorses, numbers assigned to the racehorses, the outline of a game, odds, and race results, and a computer graphic image representing the state of a race. Since the race manager 14, the miniature controller 15, and the image generator 16 are substantially the same as those employed in the known art, detailed explanations of their functions are omitted.

Of the satellite terminals 20, the satellite terminals 20 which are disposed in the second and higher tiers and equipped with the virtual telescopes 30 each provided with a position detector 26 and an image generator 25. Conceivably, the position detector 26 and the image generator 25 may also be embodied by, e.g., a CPU which executes a predetermined program, or by use of a known computer graphic preparation board.

The position detector 26 is for detecting a position on the race course 11 to which the virtual telescope 30 is oriented, by utilization of a sensor provided in the virtual telescope 30. Here, the method by which the position detector 26 detects a position to which the virtual telescope 30 is oriented will be described by reference to a specific example.

One specific example of a position detecting method is an optical position detecting method (hereinafter called an "optical method"). As shown in FIG. 1, according to the optical method, markers 26a constituted of light-emitting members, such as LEDs (light-emitting diodes), are provided at respective corners of the table having disposed thereon the race course 11 of the main unit 10. A CCD camera mounted on the virtual telescope 30 as a sensor shoots the markers 26a. The position detector 26 subjects the thus-shot image to image recognition processing and a predetermined arithmetic operation, thereby determining coordinates of the markers 26 on the table in connection with the resultant image. As a result, the position detector 26 can determine coordinates of the position on the race course 11 to which the virtual telescope 30 is oriented.

According to the optical method, alternatively, a position can be detected on the basis of the distance and direction of the position from the location from which infrared-rays have been output, by outputting infrared-rays from, e.g., at least two points on the table and receiving differences in intensity of light stemming from interference arising between the two infrared rays. It is also conceivable that a position is detected by applying a well-known frame prediction technique to an image shot by the CCD camera and analyzing a distance over which the virtual telescope 30 has moved from a reference location.

Another specific example is a mechanical position detecting method (hereinafter called a "mechanical method"). For example, as shown in FIG. 1, in a case where the virtual telescope 30 is movably supported by the support section 31 mounted on the table of the satellite terminal 20, an analog volume controller which moves in association with the virtual telescope 30 is provided beforehand in a movable portion of the support 31 as a sensor for the virtual telescope 30. On the basis of a resistance value of the volume controller, the position detector 26 perceives an elevation angle, a depression angle, and a viewing angle of the virtual telescope 30. From the results of perception, the direction in which the virtual telescope 30 is oriented is determined. As a result, the position detector 26 determines the position on the race course 11 to which the virtual telescope 30 is oriented.

As another specific example, there is mentioned an acceleration sensor method for detecting a position by perceiving a moving direction and speed of the virtual telescope 30 from a predetermined reference position, by a sensor which employs a piezoelectric element and is provided on the virtual telescope 30. Further, there is mentioned an ultrasonic position detecting method for emitting an ultrasonic wave to an object of detection and detecting the position of the object from a wave reflected from the object.

By use of a position detecting method typified by the specific examples set forth, the position detector 26 provided on each satellite terminal 20 individually detects a position on the race course 11 to which the virtual telescope 30 associated with the satellite terminal 20 is oriented. The position detecting methods described herein correspond to mere illustration of specific examples. As a matter of course, the present invention is not limited to the method.

Referring to FIG. 6, the image generator 25 is provided for each satellite terminal 20, as in the case of the position detector 26. There is produced a computer graphic image corresponding to a result of position detection performed by the position detector 26; namely, a computer graphic image representing the state of a race performed in a position on the race course 11 to which the virtual telescope 30 is oriented. The computer graphic image is displayed on the display 33 accommodated in the virtual telescope 30. At the time of generation of a computer graphic image, the image generator 25 is based on the race management information output from the race manager 14 of the main unit 10. Hence, a computer graphic image produced by the image generator 25 represents a circumstance of the position to which the virtual telescope 30 is oriented. Since the image generator 25 and the miniature controller 15 of the main unit 10 are based on the information output from the race manager 14, the computer graphic image is synchronized with the racing status of the miniature running members 12 on the race course 11.

For example, if a scroll switch to be operated by a player is provided on the virtual telescope 30, the image generator 25 produces a computer graphic image also in consideration of the nature of operation of the scroll switch.

The image generator 25 produces a computer graphic image corresponding to the state of a race performed on the race course 11, on the basis of the information output from the race manager 14 (source data for computer graphic images), a result of position detection performed by the position detector 26, and, if applicable, the nature of operation performed on the virtual telescope 30. A computer graphic image is produced by utilization of a known computer graphic image generation technique (such as a rendering or modeling technique). Hence, detailed explanations of such a technique are omitted here.

Here, the image generator 25 and the position detector may be provided within the virtual telescope 30.

Next will be described an example of processing operation to be performed by the horserace gaming machine having the foregoing construction. Here, only the processing operation pertaining to the virtual telescope 30 is described. Since other processing operations (e.g., procedures for causing the miniature running members 12 to compete with each other and procedures by which a player places bets on the predicted order of arrival) are the same as those employed in the known art, their detailed explanations are omitted.

Figure 7A:
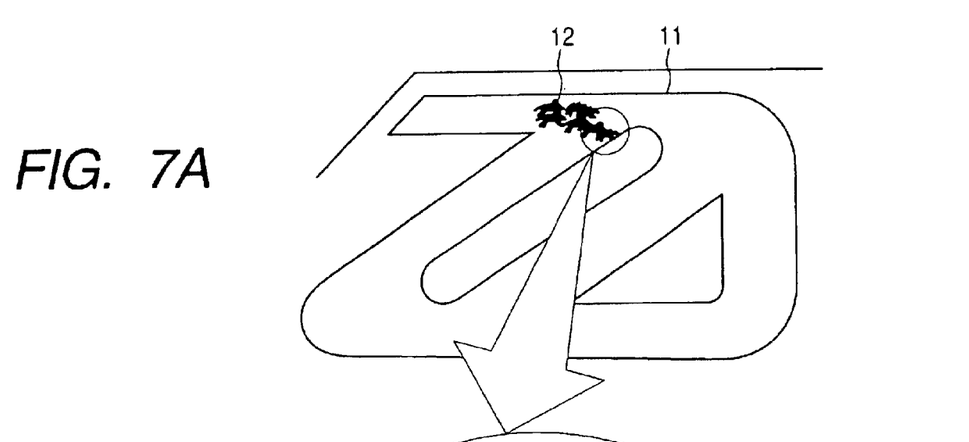
FIGS. 7A and 7B are illustrations showing an specific example of an image viewed from the virtual telescope.
Figure 7B:
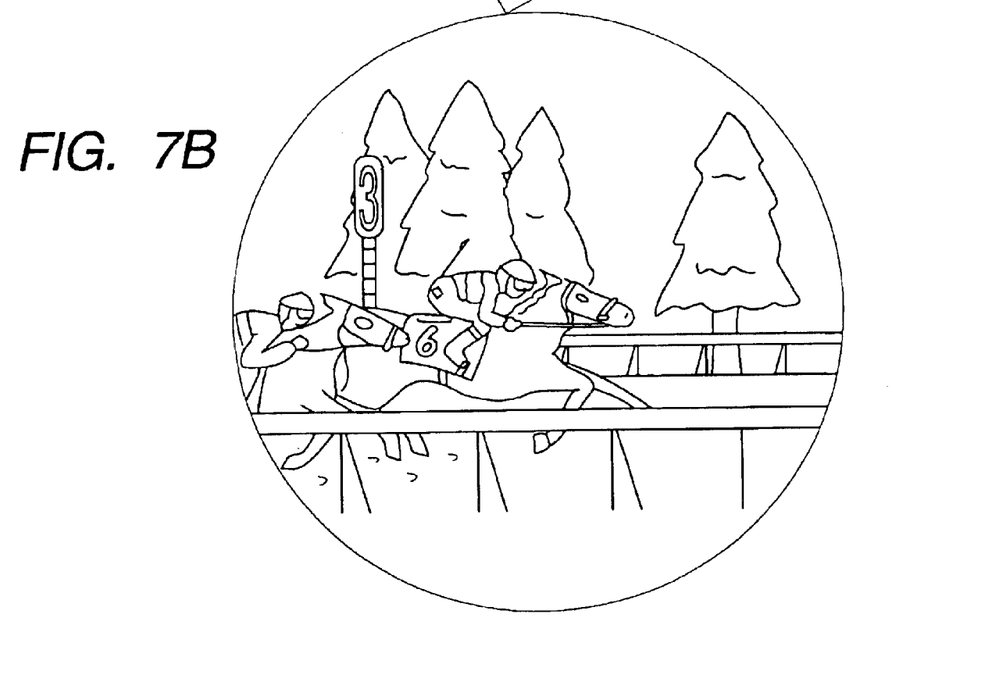

FIGS. 7A and 7B are illustrations showing a specific example of an image observed by way of the virtual telescope 30. Processing operations to be performed by the horseracing game machine are roughly divided into operations required to be performed during a race and those to be performed during interval periods other than the races.

As shown in FIG. 7A, during a race the miniature running members 12 travel on the race course 11 of the main unit 10. At this time, source data pertaining to a computer graphic image are sent from the race manager 14 to each satellite terminal 20 having the virtual telescope 30 provided thereon. The image generator 25 of each satellite terminal 20 produces a computer graphic image on the basis of the source data. The thus-produced computer graphic image is displayed on the display 33 accommodated in the virtual telescope 30.

Consequently, when a player peeps through the eyepiece section 34 of the virtual telescope 30 during a race, the player views a computer graphic image representing the state of a race performed on the race course 11 synchronized with the running statuses of the miniature running members 12 on the race course 11, as shown in FIG. 7B.

The computer graphic image is produced from the result of position detection performed by the position detector 26 as well as from the source data output from the race manager 14. Hence, the player views the state of a desired location; namely, a computer graphic image representing the state of a location to which the virtual telescope 30 is oriented. Hence, the player can view not only the state of a race in the vicinity of a leading group of the miniature running members (i.e., racehorses) 12, but also the running state of a rearward group or the state of a location irrelevant to a race.

If the virtual telescope 30 is provided with, e.g., a scroll switch, a computer graphic image is produced in consideration of the nature of operation of the scroll switch. Hence, the player can keep its eyes on the state of only an enlarged image of a specific miniature running member (i.e., a racehorse) 12.

Further, since an image to be observed by way of the virtual telescope 30 is a computer graphic image, there can be expressed details of each miniature running member 12 which are otherwise difficult to express; for example, the hair color of each horse, the name of each horse, a number assigned to each horse, motions of jockeys, changes in the surrounding landscape of the race course 11, and appearances of spectators in the stands. Hence, stage effects of the horserace are enhanced considerably, and the players can enjoy rich realism. If a computer graphic image is produced by the image generator 25 by utilization of a three-dimensional graphic technique (so-called 3D image), the realism of a horserace is preferably improved to a great extent.

Further, such a computer graphic image is produced by the image generator 25 provided for each satellite terminal 20. More specifically, the display 33 accommodated in the virtual telescope 30 mounted on each satellite terminal 20 displays a unique computer graphic image aside from an image to be displayed on the large display 13. Depending on the locations where the satellite terminals 20 are disposed, conceivably completely computer graphic images may appear on the displays 33 of the respective satellite terminals 20. Hence, the player can feel a sense analogous to that felt when the player reserves a seat in reality. Further, players sitting at a rearward satellite terminal 20 may feel a sense of viewing a race from, e.g., seats reserved for horse owners.

During an interval period between races, no miniature running members 12 run over the race course 11 of the main unit 10. The need for a player to use the virtual telescope 30 is considered to not be intense, because during this time players insert gaming tokens into the insertion slot 23, predict the order of arrival of the miniature running members (i.e., racehorses) 12, and place bets on predicted winning horses through use of the touch panel 22. However, if the race manager 14 is programmed so that players can view a computer graphic image representing the circumstances of the race course 11 (e.g., a ceremony for awarding an honor) even during an interval period, players' interest in a horserace can be enhanced much greater.

Creation of a computer graphic image to be performed by the image generator 25 and display of the thus-created computer graphic image on the display 33 may be performed at all times. For example, there may be provided a detector, such as a limiter switch for detecting uplift of the virtual telescope 30 from the table of the satellite terminal 20. If generation of a computer graphic image and display of the graphic image are performed only when a player holds up and peeps through the virtual telescope 30, processing load exerted on the satellite terminal 20 can be alleviated.

As mentioned above, in the horseracing game machine described in connection with the embodiment, when a player who operates the satellite terminal 20 peeps through the virtual telescope 30, the display 33 accommodated into the virtual telescope 30 displays a computer graphic image corresponding to the state of a race performed on the race course 11. The player can accurately ascertain the state of a race performed on the race course 11 by way of the computer graphic image. Consequently, for example, a plurality of satellite terminals 20 are tiered so that a larger number of players can enjoy a game. Even if the satellite terminals 20 disposed in the highest tier have become distant from the race course 11, the players sitting in the satellite terminals 20 located in the highest tier will not lose their interests in games, as has been in the related art. Further, the players can feel realism as if observing an actual race through use of a telescope.

In the horseracing game machine described in connection with the embodiment, virtual telescopes 30 are disposed in the respective satellite terminals 20 tiered in the second and higher rows. Consequently, difficulty of the satellite terminals 20 disposed in the second and higher tiers being distant from the race course 11 is effectively overcome. New additional values of improved stage effects due to a computer graphic image can also be added to the satellite terminals 20 disposed in the second and higher tiers. As a matter of course, the virtual telescope 30 is not limited to the satellite terminals 20 disposed in the second and higher tiers, and hence the virtual telescope 30 may be provided on all the satellite terminals 20. The same also applies to a case where the satellite terminals 20 are not tiered: namely, where the satellite terminals 20 are disposed around only the race course 11.

In the horseracing game machine described in connection with the embodiment, at the time of generation of a computer graphic image to be displayed on the virtual telescope 30, the position detector 26 and the image generator 25 produce a unique computer graphic image for each satellite terminal 20, thereby expressing the state of a location on the race course 11 at which the virtual telescope 30 is oriented. Consequently, a player can view a different computer graphic image in accordance with the position where the satellite terminal 20 to be used is disposed or a location where the player views through the virtual telescope 30. Games become full of realism, thus enhancing players' interests in games greatly.

On the basis of source data output from the race manager 14, a computer graphic image appearing on the virtual telescope 30 is produced in synchronism with the running status of each miniature running member 12. Hence, the computer graphic image is produced uniquely by each satellite terminal 20. However, the thus-produced computer graphic images are about the same race. In short, one race can be expressed by various computer graphic images from various view points, thus preferably increasing players' interests in games to a much greater extent. Further, processing load required for managing source data can be mitigated by distribution of source data from the race manager 14: that is, centralization of source data. If the source data used in each satellite terminal 20 are identical, it goes without saying that source data can be managed for each satellite terminal 20.

In the present embodiment, the present invention has been described by reference to a case where the present invention is applied to a horseracing game machine: namely, where the miniature running member 12 imitates a racehorse. The present invention is not limited to such a case. The present invention may be applied to any gaming machine in completely the same manner as that mentioned above, so long as a plurality of miniature running members run over a race course provided on a table.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A racing game machine, comprising:
   a table unit, on which a race course is provided;
   a plurality of miniature running members, traveling on the race course to perform a race; and
   a plurality of satellite terminals, arranged around the table unit, each operated by a player who participates the race as an audience, each of at least two of the satellite terminal being provided with a virtual telescope including a built-in display showing to the player a computer graphic image which exhibits a state of the race performed on the race course as if the player observes the race therethrough
   wherein the computer graphic image shown by the virtual telescope in one of the satellite terminals is different from the computer graphic image shown by the virtual telescope in another one of the satellite terminals.

2. The racing game machine as set forth in claim 1, wherein:
   the satellite terminals are arranged so as to be tiered relative to the race course; and the satellite terminals provided with the virtual telescope are disposed in second or higher tiers.

3. The racing game machine as set forth in claim 1, wherein each satellite terminal is provided with:

a position detector, which detects a position on the race course to which the virtual telescope is oriented; and an image generator, which generates a computer graphic image exhibiting a view at the position detected by the position detector, which is to be displayed on the built-in display.

4. The racing game machine as set forth in claim 3, further comprising:

a race manager, which generates a management data to manage the race performed on the race course;

a miniature controller, which controls the respective miniature running members in accordance with the management data, wherein the image generator generates the computer graphic image in accordance with the management data.

5. The racing game machine as set forth in claim 3, further comprising a detection switch provided on at least one of the satellite tables and the virtual telescopes, and activated when the player looks into the virtual telescope, wherein the image generator is activated only when the detection switch is activated.

6. The racing game machine as set forth in claim 1, wherein:

the miniatures running members imitate racehorses; and the player predicts an order of arrival of the racehorses with betting.

* * * * *